(12) United States Patent
Tait

(10) Patent No.: US 9,247,714 B1
(45) Date of Patent: Feb. 2, 2016

(54) ANIMAL DETERRENT AND TRAINING DEVICE AND METHOD THEREOF

(71) Applicant: Shawn Tait, Issaquah, WA (US)

(72) Inventor: Shawn Tait, Issaquah, WA (US)

( * ) Notice: Subject to any disclaimer, the term of this patent is extended or adjusted under 35 U.S.C. 154(b) by 24 days.

(21) Appl. No.: 14/486,090

(22) Filed: Sep. 15, 2014

(51) Int. Cl.
*A01K 15/02* (2006.01)

(52) U.S. Cl.
CPC .................................. *A01K 15/021* (2013.01)

(58) Field of Classification Search
CPC ... A01K 15/023; A01K 15/022; A01K 15/02; A01K 15/021; A01K 27/009; Y10S 119/905; Y10S 119/908; A01M 29/30; A01M 31/002
USPC ......... 119/719, 720, 712, 718, 721, 905, 908, 119/174, 666, 859; 340/573.3, 573.1, 573.4
See application file for complete search history.

(56) References Cited

U.S. PATENT DOCUMENTS

| | | | | |
|---|---|---|---|---|
| 5,009,192 A * | 4/1991 | Burman | A01K 15/023 | 119/719 |
| 5,501,179 A * | 3/1996 | Cory | A01K 15/023 | 119/712 |
| 5,603,287 A * | 2/1997 | Houck | A01K 15/023 | 119/719 |
| 5,845,984 A * | 12/1998 | Bonilla | A01K 15/02 | 119/905 |
| 5,872,516 A * | 2/1999 | Bonge, Jr. | A01K 15/023 | 119/719 |
| 6,191,693 B1 * | 2/2001 | Sangsingkeow | A01K 15/023 | 119/720 |
| 6,431,122 B1 * | 8/2002 | Westrick et al. | A01K 15/023 | 119/721 |
| 6,439,162 B1 * | 8/2002 | van den Berg | A01K 1/0103 | 119/174 |
| 6,668,760 B2 * | 12/2003 | Groh et al. | A01K 15/022 | 119/718 |
| 6,700,486 B1 * | 3/2004 | Banki | A01M 29/10 | 119/719 |
| 7,658,166 B1 * | 2/2010 | Rheinschmidt, Jr. et al. | A01K 15/022 | 119/712 |
| 7,690,146 B2 * | 4/2010 | Jong et al. | A01M 29/16 | 116/22 A |
| 8,904,968 B1 * | 12/2014 | Nelson | A01M 31/002 | 119/712 |

* cited by examiner

*Primary Examiner* — Yvonne Abbott-Lewis

(57) ABSTRACT

An animal deterrent and training device and method thereof. Particularly, the present application provides a portable animal deterrent and training device, which is characterized by enabling horizontal as well as vertical operational position for maximizing range of operation, deterrent and training effect. More particularly, the present application provides an animal deterrent and training device comprising a housing enclosure; a battery power supply; a passive infrared sensor surrounded by vertical walls; an integral user self-refillable fluid reservoir; a fluid pump; an electronic record-play voice module; and a vertical hanger loop pull-out.

11 Claims, 14 Drawing Sheets

ANIMAL DETERRENT AND TRAINING DEVICE AND METHOD THEREOF

FIELD OF THE INVENTION

The present application generally relates to the field of deterrent and training device. Particularly, the application provides an animal deterrent and training device and method thereof. More particularly, the invention relates to a portable battery powered automatic device and methods for deterring and training indoor household animals.

BACKGROUND

Recent time has witnessed a greater degree of affection towards household animals/pet by common man. A variety of animals can be considered to become household animals, being dogs and cats very common among others. While household animals bring lot of advantages with them, at the same time they create a state of difficulty for their owners as well for others. Among other problems, keeping the pet, from jumping on countertops and counter-surfing, indoor pets from escaping when entry doors opened, climbing up curtains, re-visiting and soiling or spraying areas, entering off-limits areas, and loitering in unwanted areas or on unwanted surfaces are considered seriously. It has become a challenge for owners to train and deter their household animals from exhibiting unwanted behavior or intrusions.

Prior art literature illustrates a variety of devices that can help pet owners up to a certain limit. Prior art also illustrate a variety of method, system, apparatuses or devices for deterring and training their indoor animal. Some of the existing method, system, apparatuses or devices related to deterring and training an animal and method thereof known to us are as follows:

U.S. Pat. No. 6,216,925, issued to Garon in 2001, assigned to Multi-Vet Ltd. discloses about an automatic aerosol dispenser, particularly utilizing sensor to trigger deterrent output consisting of a pulse of compressed canned air, which utilizes a proprietary consumable deterrent refill.

U.S. Pat. No. 5,501,179, issued to Cory in 1996 teaches about an indoor household animal deterrent device, particularly it utilizes sensor to trigger deterrent output consisting of fluid, and sprinkler or spray mechanism.

U.S. Pat. No. 6,615,770, issued to Patterson, assigned to Sharper Image Corporation in 2003 discloses a method and apparatus to control animal behavior, particularly it utilizes sensor to trigger deterrent output consisting of audio sound, beep or recorded message.

Prior art literatures have certain limitations while addressing the technical problem. Prior art solutions are costly, by having non-self-refillable consumable deterrent supply reservoir. Prior art solution does not illustrate integrated liquid/fluid supplier reservoir within immediate proximity or the deterrent nozzle, thereby making it portable and compact. Prior art does not provide any solution for customize voice commands apart from ordinary daily household noises and sounds. Prior art does not address an uncontrolled or unmitigated sensor vector detection range of operation, allowing sensing and false triggering device deterrent inadvertently by human passer-by problem.

Thus, in the light of the above mentioned background discussion, it is evident that, there is a need for a solution which could provide a portable, compact, integrated, cost effective, device for animal deterrent and training which is self-refillable. There is a need for a device which could combine fluid, water deterrent and voice commands for deterring and training animals. There is also a need for a solution which could provide a portable animal deterrent and training device which can work in horizontal as well as vertical operational position for maximizing range of operation, deterrent and training effect. An animal deterrent and training device and method thereof is desired.

SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

In accordance with the present application, the primary objective is to provide an animal deterrent and training device and method thereof.

Another objective is to provide a portable animal deterrent and training device (20), which could utilize a combination of a liquid deterrent and an audible training command. The present invention enables much greater training or deterrent effect while using combined deterrent method, wherein immediately preceding or proceeding the liquid deterrent event directed at the offending animal, include an audible training command, or scolding from the pet owners voice.

Another objective is to provide a portable animal deterrent and training device (20), which is characterized by enabling horizontal as well as vertical operational position of said animal deterrent and training device (20) for maximizing range of operation, deterrent and training effect. The animal deterrent and training device (20) comprises of a housing enclosure, for enclosing a plurality of components of said animal deterrent and training device (20); a battery power supply (60A), for powering said animal deterrent and training device (20); a passive infrared sensor (67) surrounded by vertical walls (28), for sensing animal heat signature (12) while passing in front of passive infrared sensor (67) detection range (18) and triggering a deterrent response; an integral user self-refillable fluid reservoir (32), for storing and dispensing fluid, water deterrent, or aromatic deterrent scent; a fluid pump (40), for pumping fluid, water deterrent, or aromatic deterrent scent through a fluid spray nozzle mist spray jet (58); an electronic record-play voice module (70), for recording and playing user defined voice commands (17) as a deterrent response; and a vertical hanger loop pull-out (80) comprising a vertical hanger recess and a retractable vertical hanger, for enabling said animal deterrent and training device (20) to be placed in both horizontal as well as vertical position.

The above said device and method thereof is provided for an animal deterrent and training but also can be used for many other applications.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

In an embodiment of the present invention, a portable animal deterrent and training device is a compact portable low cost effective device and solution for deterring indoor animals from off-limits unwanted areas or unwanted surfaces. The animal deterrent and training device uses means and methods that join active contact and non-contact passive training and deterrent methods, together creating a synergistic result in the training and deterrent of the indoor household animals.

The device utilizes time-proven means and methods that have proven to be effective in training and deterring indoor animals from exhibiting unwanted behavior or intrusions. The deterrents provided by the animal deterrent and training device consists of but not limited to, 1) the output dispersal of a liquid or fluid deterrent such as simple household tap water for direct and active contact towards the offending animal, 2) the output dispersal of a liquid or fluid aromatic deterrent scent for use as passive non-contact deterrent towards the offending animal, 3) the output of audio sound, training command or scolding voice deterrent for use as a passive non-contact deterrent towards the offending animal.

The animal deterrent and training device disclosed in the present invention provides five different deterrent training methods or deterrent modes: 1) Spray Only (water), 2) Spray (water) & Sound/Voice, 3) Sound/Voice Only, 4) Mist Only (aromatic deterrent scent), 5) Mist (aromatic deterrent scent) & Sound/Voice, using the combination method of engaging both active contact and non-contact passive deterrents yields a synergistic result amplifying the device deterrent effect.

Figure 1A:
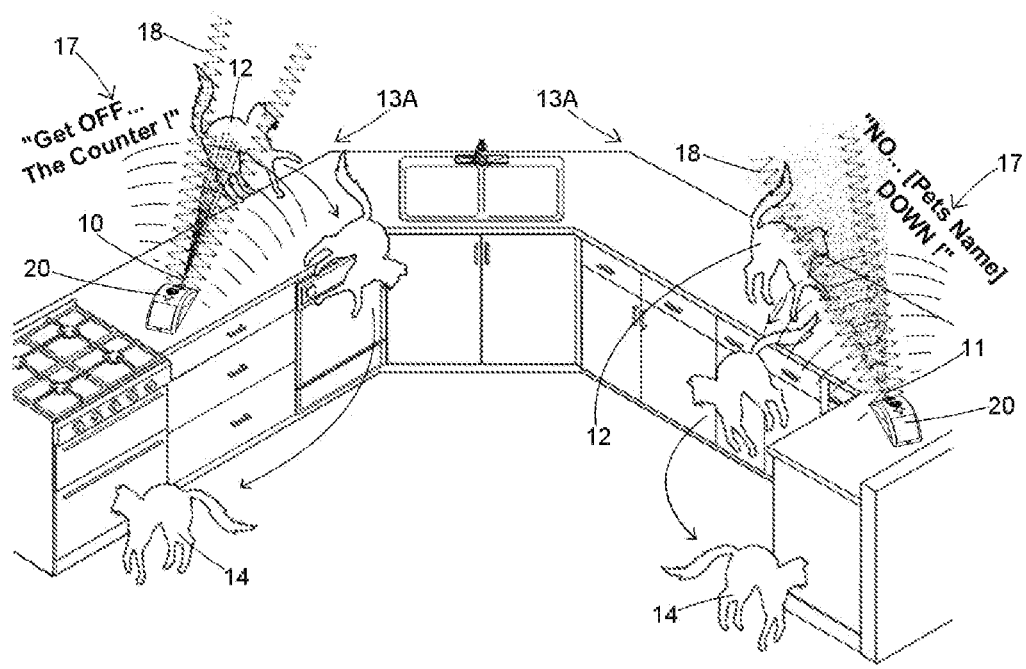
FIG. 1A: shows a graphical illustration of working of a portable animal deterrent and training device in horizontal position.

Referring to FIG. 1A is a graphical illustration of working of a portable animal deterrent and training device in a horizontal position.

In another embodiment of the present invention, the portable animal deterrent and training device (20) is provided, to deter animals (12) from off-limits unwanted area or surface. The portable animal deterrent and training device (20) is placed in the horizontal position for maximum deterrent and training effect, and range of operation. The portable animal deterrent and training device (20) is placed on the horizontal surface such as a countertop to actively deter animals (12) away from off-limits unwanted area or surface (13A).

In another embodiment of the present invention, the portable animal deterrent and training device (20) is placed horizontally in an active contact deterrent mode, wherein the portable animal deterrent and training device (20) may provide water or fluid deterrent spray jet Output (10).

In another embodiment of the present invention, the portable animal deterrent and training device (20) is placed horizontally in a passive non-contact deterrent mode, wherein the portable animal deterrent and training device (20) may provide aromatic deterrent scent mist-spray output (11).

In another embodiment of the present invention, the portable animal deterrent and training device (20) is placed horizontally and may produce an audible deterrent output (17) using an electronic record-play voice module (70), adapted for recording and playing user defined voice commands as a deterrent response. The deterrent response of the electronic record-play voice module (17) is selected from a group comprising of a sound, a voice, a scolding and a training command. The detered animal (14) gets down from unwanted area or surface.

Figure 1B:
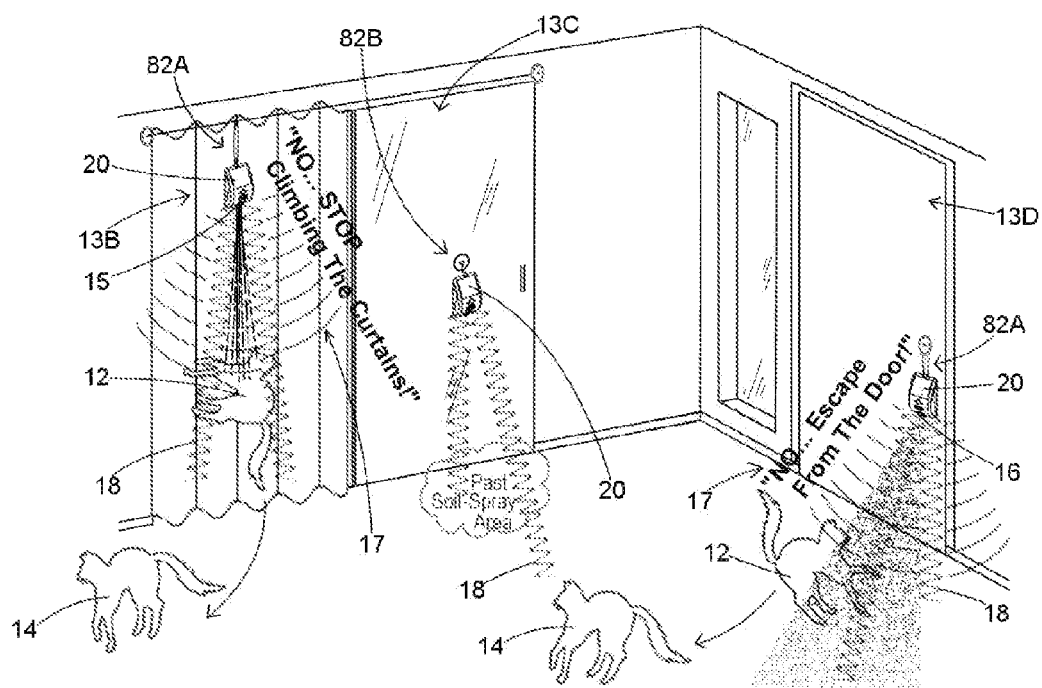
FIG. 1B: shows a graphical illustration of working of a portable animal deterrent and training device in vertical position.

Referring to FIG. 1B is a graphical illustration of working of a portable animal deterrent and training device in a vertical position.

In another embodiment of the present invention, the portable animal deterrent and training device (20) is provided, to deter animals (12) from off-limits unwanted area or surface. The portable animal deterrent and training device (20) is placed in the vertical position for maximum deterrent and training effect, and range of operation. The portable animal deterrent and training device (20) is placed vertically to actively deter animals (12) away from off-limits unwanted area or surface such as a curtain (13B), a glass (13C), a door (13D).

In another embodiment of the present invention, the portable animal deterrent and training device (20) is placed vertically on a curtain hanging rod to actively deter animal away from off-limits unwanted area or surface (13B) with the help of a hang-up lanyard (82A).

In another embodiment of the present invention, the portable animal deterrent and training device (20) is placed vertically on a smooth vertical surface such as glass to actively deter animal away from off-limits unwanted area or surface (13C) with the help of a suction cup hanger (82B).

In another embodiment of the present invention, the portable animal deterrent and training device (20) is placed vertically on a door knob, door latch, door lock, etc. to actively deter animal away from off-limits unwanted area or surface (13D) with the help of the hang-up lanyard (82A).

In another embodiment of the present invention, the portable animal deterrent and training device (20) is placed vertically in an active contact deterrent mode, wherein the portable animal deterrent and training device (20) may provide water or fluid deterrent spray jet Output (15).

In another embodiment of the present invention, the portable animal deterrent and training device (20) is placed vertically in a passive non-contact deterrent mode, wherein the portable animal deterrent and training device (20) may provide aromatic deterrent scent mist-spray output (16).

In another embodiment of the present invention, the portable animal deterrent and training device (20) is placed vertically and may produce the audible deterrent output using the electronic record-play voice module (70), adapted for recording and playing user defined voice commands as the deterrent response. The deterrent response (17) of the electronic record-play voice module (70), is selected from a group comprising of the sound, the voice, the scolding and training command. The deterred animal (14) gets down from, or away from unwanted area or surface.

Figure 2:
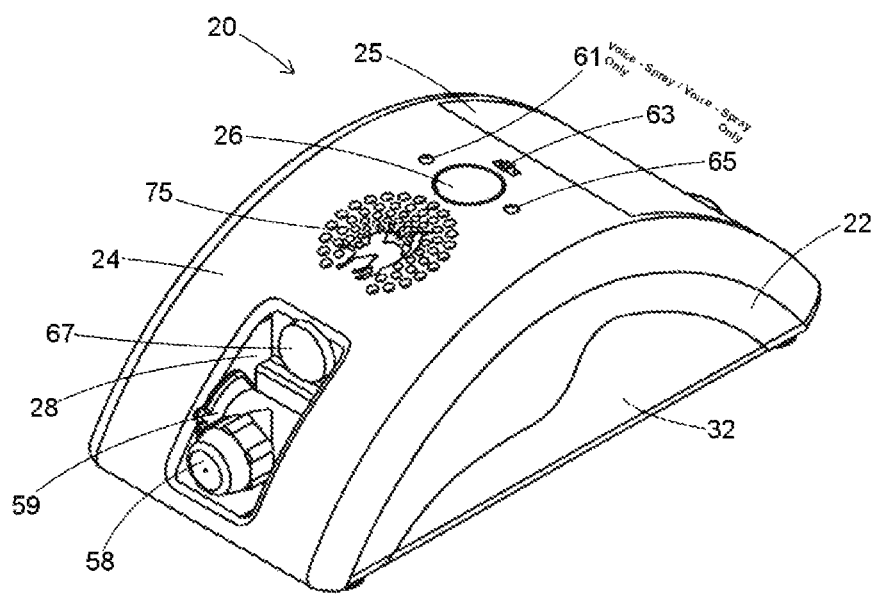
FIG. 2: shows a perspective view of a portable animal deterrent and training device.

Referring to FIG. 2 is a perspective view of a portable animal deterrent and training device.

In another embodiment of the present invention, the portable animal deterrent and training device (20) is provided. The portable animal deterrent and training device (20) comprises of a housing enclosure, a battery cover (25), an on-off power button (26), a passive infrared sensor (67) surrounded by vertical walls (28), an integral user self-refillable fluid reservoir (32), a fluid spray nozzle mist spray jet (58), a thumbwheel trajectory adjuster for spray nozzle (59), a low battery indicator LED circuit (61), a mode selector switch (63), an on-off/armed indicator LED (65), and a speaker vent (75).

In another embodiment of the present invention, the housing enclosure is provided for enclosing a plurality of components of said portable animal deterrent and training device (20). The housing enclosure of the portable animal deterrent and training device (20) further comprises of a lower housing chassis (22) and an upper housing cover enclosure (24).

In another embodiment of the present invention, the passive infrared sensor (67) is surrounded by vertical walls (28). The passive infrared sensor (67) senses animal heat signature (12) while passing in front of passive infrared sensor (67) detection range (18) and triggers a deterrent response. The passive infrared sensor (67) is specially designed to eliminate false sensing, activation or triggering of deterrent device by inadvertent human passage in the passive infrared sensor (67) detection range (18).

In another embodiment of the present invention, the integral user self-refillable fluid reservoir (32) is provided for storing and dispensing fluid, water deterrent, or aromatic deterrent scent.

In another embodiment of the present invention, the fluid spray nozzle mist spray jet (58) is enabling a fluid pump (40) to pump fluid, water deterrent, or aromatic deterrent scent. The fluid spray nozzle mist spray jet (58) prevents siphoning or leaking of fluid, water deterrent, or aromatic deterrent.

In another embodiment of the present invention, the thumbwheel trajectory adjuster for spray nozzle (59) is provided for adjusting the altitude or trajectory of the fluid deterrent (21A, 21B) dispersed via the fluid spray nozzle mist spray jet (58).

In another embodiment of the present invention, the low battery indicator LED circuit (61) is a 4-stage low battery indicator LED, the low battery indicator LED (61) is in the off mode when batteries in a battery power supply (60A) are fully charged, as the battery power supply (60A) voltage drops, the low battery indicator LED (61) will begin to blink slowly and the rapidly increase as the battery power supply (60A) voltage drops. The 4-stage low battery indicator LED (61) indicates "No Red LED illumination" when at Full Charge; "Red LED begins to glow" when at 75% Charge; "Red LED slowly flashes" when at 50% Charge; and "Red LED flashes rapidly" when at 25% Charge.

In another embodiment of the present invention, the mode selector switch (63) is a 3-way deterrent mode selector switch, enabling a user to select from multiple deterrent methods described above (10,11,15,16,17) including but not limited to fluid spray (21A, 21B), record and play audio, voice, and sound deterrents.

Figure 3A:
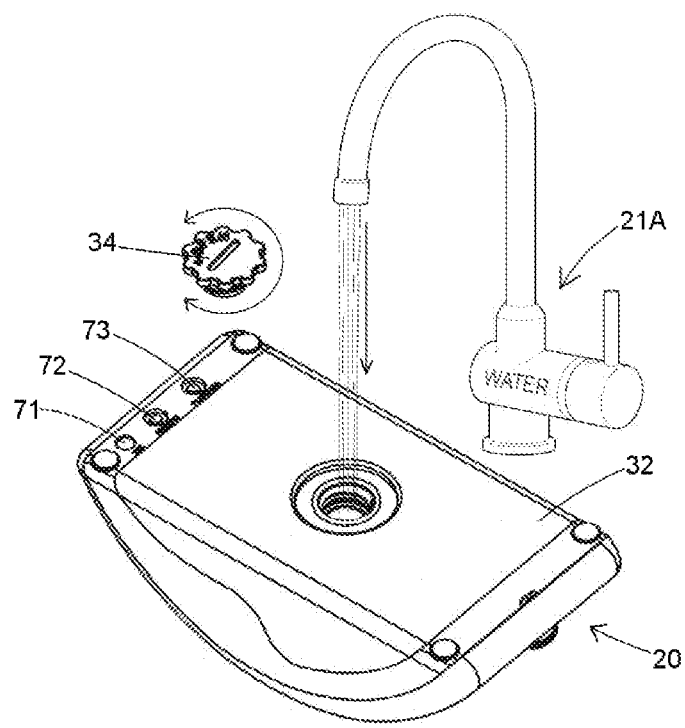
FIG. 3A: shows a view illustrating a portable animal deterrent and training device refilling with water.

Referring to FIG. 3A is a view illustrating a portable animal deterrent and training device refilling with water.

In another embodiment of the present invention, the fluid reservoir (32) of the animal deterrent and training device (20) is filled with a kitchen water faucet which is dispensing fluid water (21A). The fluid reservoir (32) of the animal deterrent and training device (20) is then closed by a fluid reservoir fill-plug (34).

The animal deterrent and training device (20) is having the electronic record-play voice module (70), for recording and playing user defined voice commands as a deterrent response. The user can record (72) via internal microphone (71), audio, voice and or other sound deterrent to scold, deter or train offending animal from entering an unwanted intrusion area, and playback (73) of sound deterrent (17) using an internal speaker (74).

Figure 3B:
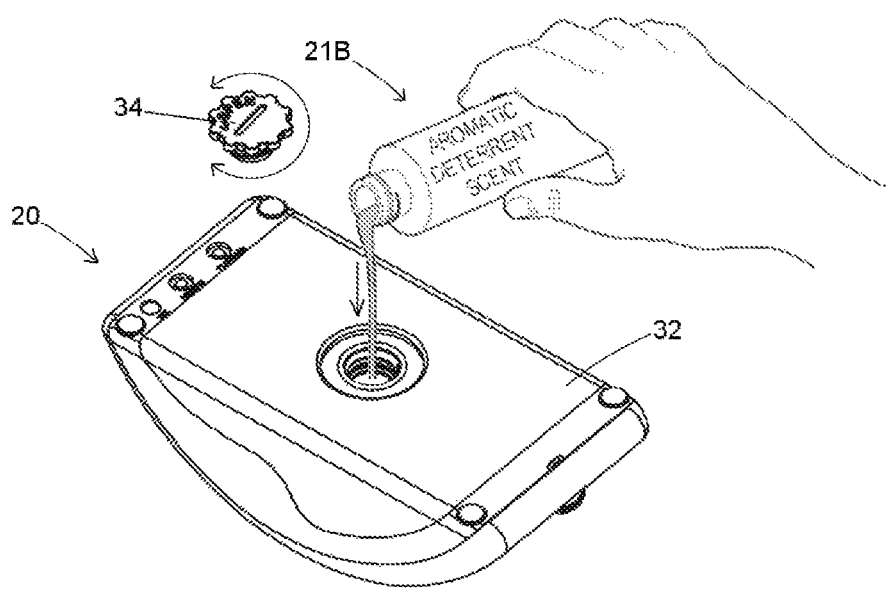
FIG. 3B: shows a view illustrating a portable animal deterrent and training device refilling with aromatic deterrent scent.

Referring to FIG. 3B is a view illustrating a portable animal deterrent and training device refilling with aromatic deterrent scent.

In another embodiment of the present invention, the fluid reservoir (32) of the animal deterrent and training device (20) is filled with an aromatic deterrent scent bottle dispensing fluid/scent (21B). The fluid reservoir (32) of the animal deterrent and training device (20) is then closed by the fluid reservoir fill-plug (34).

Figure 4:
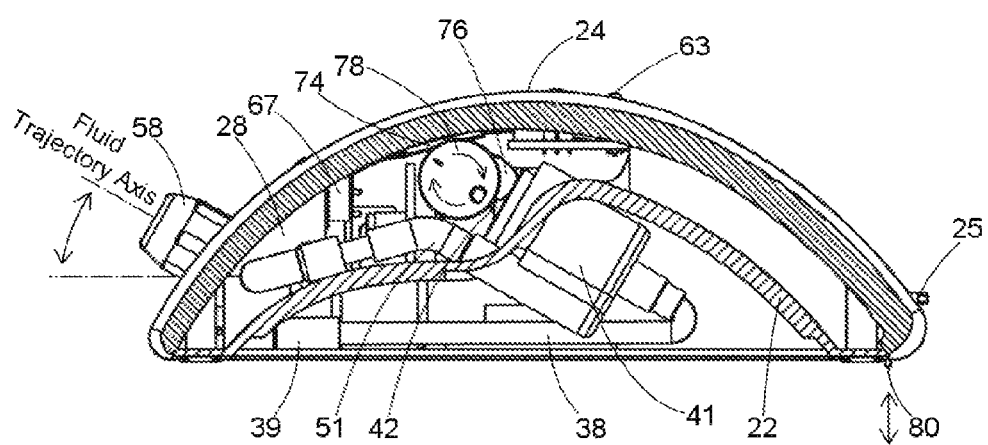
FIG. 4: shows a right sectional view of a portable animal deterrent and training device.

Referring to FIG. 4 is a right sectional view of a portable animal deterrent and training device.

In another embodiment of the present invention, the animal deterrent and training device (20) comprises of the lower housing chassis (22), the upper housing cover enclosure (24), the battery cover (25), the passive infrared sensor (67) surrounded by vertical walls (28), a fluid reservoir pick-up tube (38), a fluid reservoir pick-up tube filter (39), a fluid pump housing (41), a fluid pump piston (42), the fluid spray nozzle mist spray jet (58), the mode selector switch (63), the speaker (74), a DC motor with gear reduction drive (76), a motor shaft eccentric cam actuator (78), and a vertical hanger loop pullout (80).

In another embodiment of the present invention, the animal deterrent and training device (20) enable fluid spray deterrent (10,11,15,16) driven by the battery power supply (60A) to operate the DC motor with gear reduction drive (76) with attached motor shaft eccentric cam actuator (78), in direct contact with fluid pump piston (42) is designed in such a manner to draw fluid from fluid spray deterrent reservoir pump (40), supplying a fluid to the anti-leak and anti-siphon fluid spray nozzle mist spray jet (58), simulating a pulsed trigger type of fluid spray-mist (10,11,15,16) mimicking a typical standard trigger fluid spray bottle that animal owners often use to deter animal from unwanted behavior.

In another embodiment of the present invention, the vertical hanger loop pullout (80) further comprises of a vertical hanger recess and a retractable vertical hanger for enabling said animal deterrent and training device (20) to be placed in both horizontal as well as vertical position. The vertical hanger loop pullout (80) is retractable for non-vertical-use (13A,10,11) within the animal deterrent and training device (20) allowing the animal deterrent and training device (20) to be placed or oriented flat in a horizontal position on a flat surface (10) for maximum deterrent and training effect, and range of operation. The retractable vertical hanger loop (80) may be extended beyond the animal deterrent and training device (20) as so the animal deterrent and training device (20) can utilize various household vertical hanging positions (82A,82B,13B,13C,13D).

Figure 5:
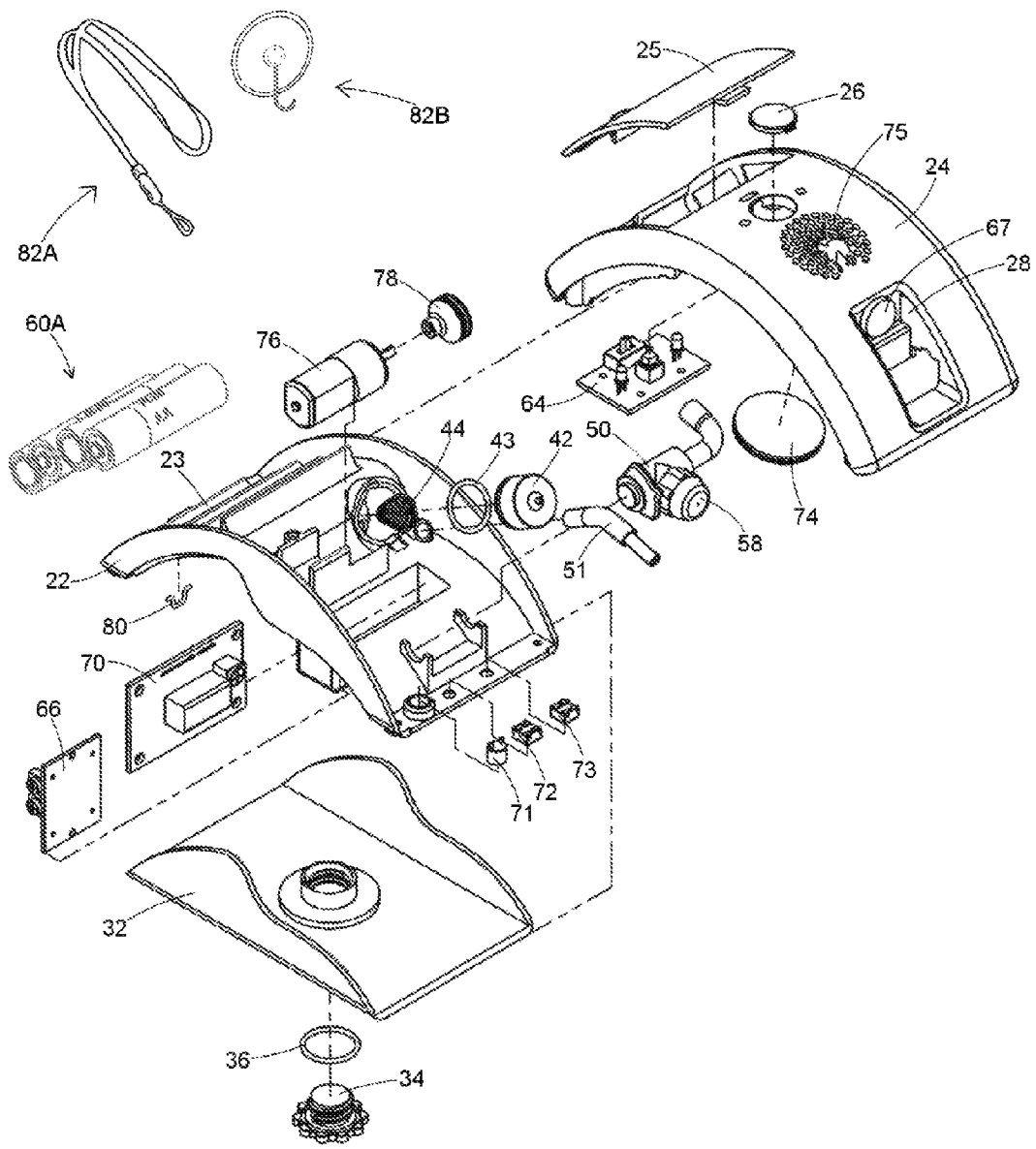
FIG. 5: shows an exploded view of a portable animal deterrent and training device.

Referring to FIG. 5 is an exploded view of a portable animal deterrent and training device.

In another embodiment of the present invention, the animal deterrent and training device (20) comprises of the lower housing chassis (22), a battery bed (23), the upper housing cover enclosure (24), the battery cover (25), the on-off power button (26), the passive infrared sensor (67) surrounded by vertical walls (28), the fluid reservoir (32), a fluid reservoir fill-plug (34), a fluid reservoir fill-plug o ring seal (36), the fluid pump piston (42), a fluid pump o ring seal (43), a fluid pump piston extension spring (44), an adjustable fluid spray nozzle assembly (50), the fluid spray nozzle mist spray jet (58), the battery power supply comprising 6 v Source—4 AA Battery (60A), a control panel PCB assembly on-off switch, mode selector switch, armed LED, low battery LED) (64), a passive infrared sensor module PCB (66), the passive infrared sensor (67), a voice module PCB (70), the microphone (71), the voice module record tactile button switch (72), the voice module playback tactile button switch (73), the speaker (74), the speaker vent (75), the DC motor with gear reduction drive (76), the motor shaft eccentric cam actuator (78), the vertical hanger loop pullout (80), the hang-up lanyard (82A), and suction cup hanger (82B).

Figure 6A:
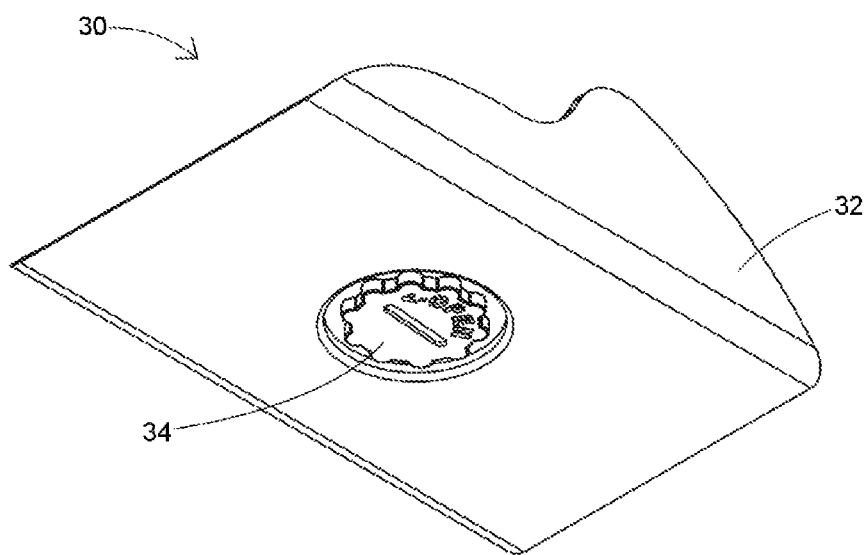
FIG. 6A: shows a lower perspective view of a fluid reservoir of a portable animal deterrent and training device.

Referring to FIG. 6A is a lower perspective view of a fluid reservoir of a portable animal deterrent and training device.

In another embodiment of the present invention, a fluid reservoir assembly (30) is provided, wherein the fluid reservoir (32) of the animal deterrent and training device (20) is closed by the fluid reservoir fill-plug (34).

Figure 6B:
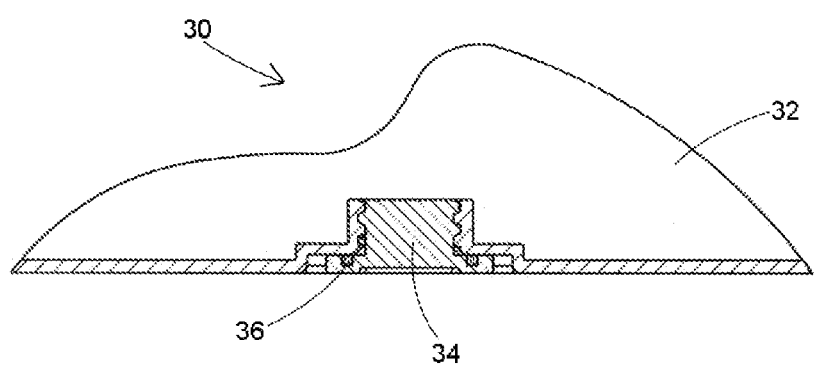
FIG. 6B: shows a right sectional view of a fluid reservoir of a portable animal deterrent and training device.

Referring to FIG. 6B is a right sectional view of a fluid reservoir of a portable animal deterrent and training device.

In another embodiment of the present invention, the fluid reservoir assembly (30) is provided, wherein the fluid reservoir (32) of the animal deterrent and training device (20) is closed by the fluid reservoir fill-plug (34) with the help of a fluid reservoir fill-plug o ring seal (36).

Figure 7A:
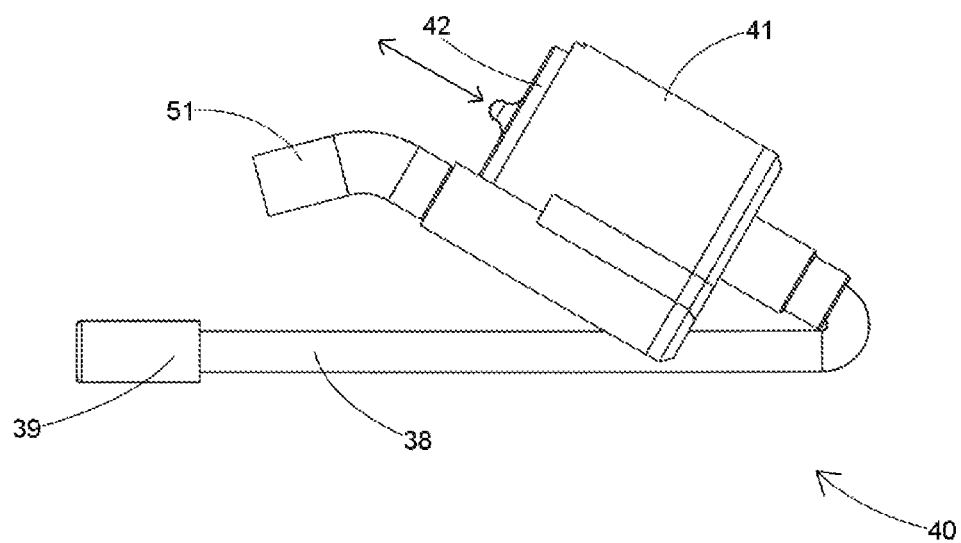
FIG. 7A: shows a fluid pump of a portable animal deterrent and training device.

Referring to FIG. 7A is a fluid pump of a portable animal deterrent and training device.

In another embodiment of the present invention, a fluid pump assembly (40) is provided. The fluid pump assembly (40) further comprises of the fluid reservoir pick-up tube (38), the fluid reservoir pick-up tube filter (39), the fluid pump housing (41), and the fluid pump piston—2 pieces (42).

Figure 7B:
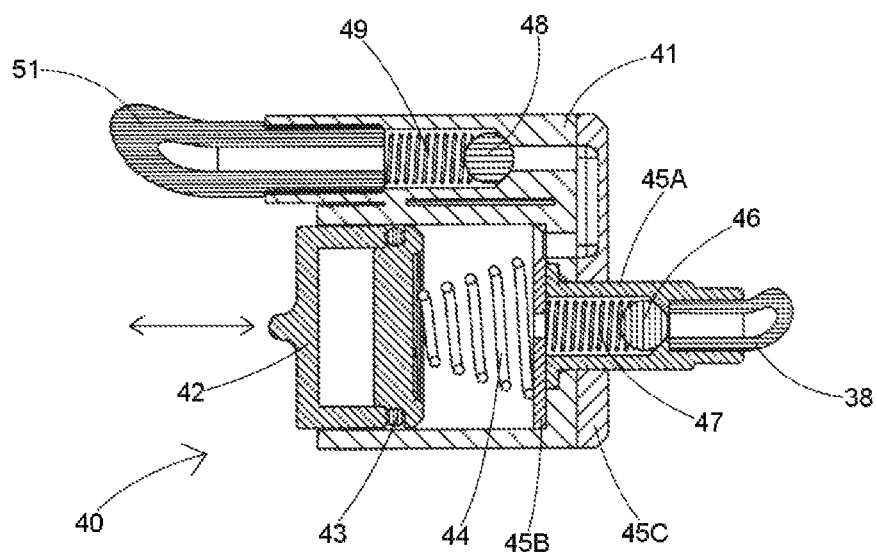
FIG. 7B: shows a sectional view of a fluid pump of a portable animal deterrent and training device.

Referring to FIG. 7B is a sectional view of a fluid pump of a portable animal deterrent and training device.

In another embodiment of the present invention, the fluid pump assembly (40) further comprises of the fluid reservoir pick-up tube (38), the fluid reservoir pick-up tube filter (39), the fluid pump housing (41), the fluid pump piston—2 pieces (42), a fluid Pump O-Ring Seal (43), a fluid pump piston extension spring (44), a fluid pump inlet check valve sleeve (45A), a fluid inlet check valve to crossover plate (45B), a fluid pump to check valve crossover plate (45C), a fluid pump check valve ball—anti-siphon (46), a fluid pump check valve spring—anti-siphon (47), a fluid pump check valve ball—anti-leak (48), and fluid pump check valve spring—anti-leak (49). The fluid pump (40) supplies fluid spray deterrent (21A, 21B) to anti leak ball check valve anti drip ball check valve (52, 55, 56) contained in the fluid spray nozzle mist spray jet (58) utilizing a specialized anti-siphon (45A,45B,46,47) anti-leak (41,48,49,51) fluid pump (40) design. The fluid pump assembly (40) controls anti-siphon action to the an integral user self-refillable fluid reservoir (32) for ensuring that the spray deterrent reservoir fluid pump (40) is always primed and available to supply fluid spray deterrent (21A, 21B) immediately to the fluid pump (40) via ball check valve (41,48,49,51) assembly.

Figure 8A:
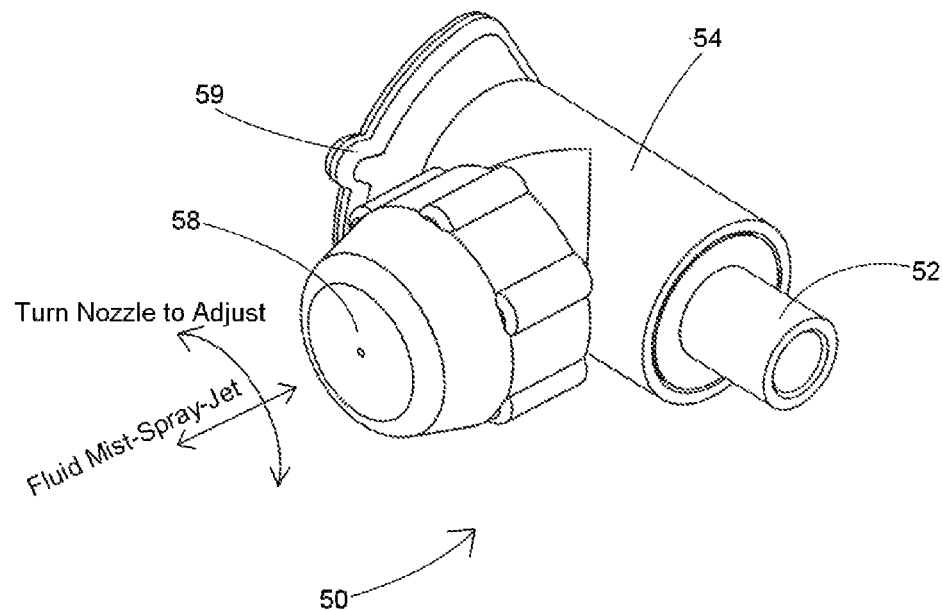
FIG. 8A: shows an adjustable fluid spray nozzle of a portable animal deterrent and training device.

Referring to FIG. 8A is an adjustable fluid spray nozzle of a portable animal deterrent and training device.

In another embodiment of the present invention, the adjustable fluid spray nozzle assembly (50) further comprises of a fluid pump to spray nozzle assembly inlet with integral seat for ball-spring-check valve (52), an adjustable fluid spray housing (54), the fluid spray nozzle—mist-spray-jet (58), and a thumbwheel trajectory adjuster for spray nozzle (59).

Figure 8B:
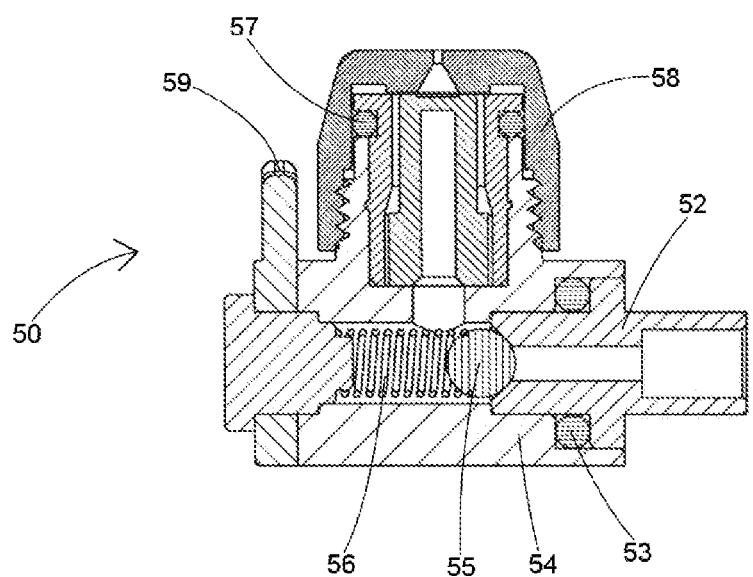
FIG. 8B: shows a sectional view of an adjustable fluid spray nozzle of a portable animal deterrent and training device.

Referring to FIG. 8B is a sectional view of an adjustable fluid spray nozzle of a portable animal deterrent and training device.

In another embodiment of the present invention, the adjustable fluid spray nozzle assembly (50) further comprises of a fluid pump to spray nozzle assembly inlet with integral seat for ball-spring-check valve (52), A spray nozzle assembly inlet o ring seal (53), the adjustable fluid spray housing (54), a spray nozzle check valve ball—anti-siphon (55), a spray nozzle check valve spring—anti-siphon (56), a spray nozzle o ring seal (57), the fluid spray nozzle—mist-spray-jet (58), and the thumbwheel trajectory adjuster for spray nozzle (59). The fluid spray deterrent (21A, 21B) of the animal deterrent and training device (20), utilizes the integral user self-refillable fluid reservoir (32). The fluid spray deterrent is supplied to anti leak ball check valve anti drip ball check valve (52, 55, 56) contained in the fluid spray nozzle mist spray jet (58).

Figure 9:
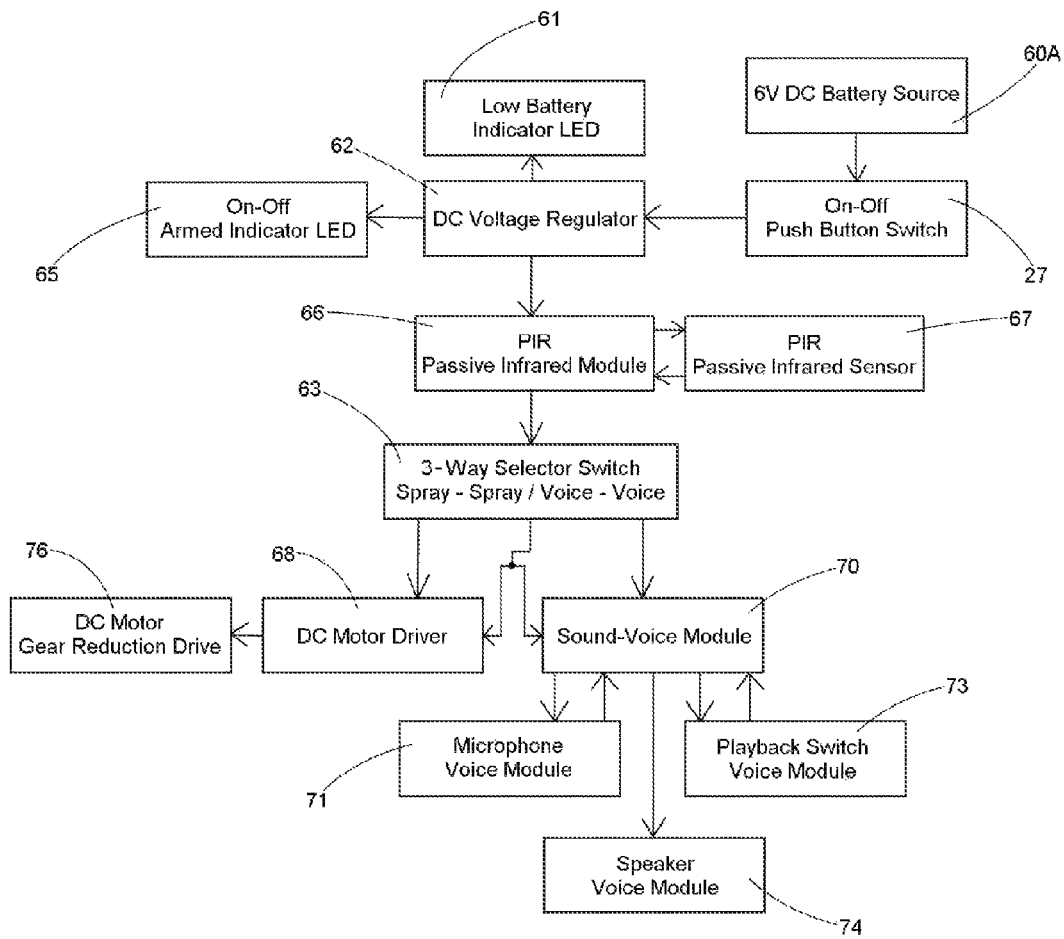
FIG. 9: shows a block diagram of system components of a portable animal deterrent and training device.

Referring to FIG. 9 is a block diagram of system components of a portable animal deterrent and training device.

In another embodiment of the present invention, the following system components of the portable animal deterrent and training device (20) are illustrated and their respective operational dependencies are illustrated. The on-off power push button switch (27), the battery power supply comprising 6 v Source—4 AA battery (60A), the low battery indicator LED circuit (61), a voltage regulator (62), the mode selector switch (63), the on-off/armed indicator LED (65), the passive infrared sensor module PCB (66), the passive infrared sensor (67), the DC motor driver (68), a voice module PCB (70), the microphone (71), the voice module—playback—tactile button switch (73), the speaker (74), and the DC Motor with Gear Reduction Drive (76).

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

I claim:

1. A portable animal deterrent and training device (20), characterized by enabling horizontal as well as vertical operational position of said animal deterrent and training device (20) for maximizing range of operation, deterrent and training effect; said animal deterrent and training device (20) comprises of:
   a. a housing enclosure, for enclosing a plurality of components of said animal deterrent and training device (20);
   b. a battery power supply (60A), for powering said animal deterrent and training device (20);
   c. a passive infrared sensor (67) surrounded by vertical walls (28), for sensing animal heat signature (12) while passing in front of passive infrared sensor (67) detection range (18) and triggering a deterrent response;
   d. an integral user self-refillable fluid reservoir (32), for storing and dispensing fluid, water deterrent, or aromatic deterrent scent;
   e. a fluid pump (40), for pumping fluid, water deterrent, or aromatic deterrent scent through a fluid spray nozzle mist spray jet (58);
   f. an electronic record-play voice module (70), for recording and playing user defined voice commands as a deterrent response (17); and
   g. a vertical hanger loop pull-out (80) comprising a vertical hanger recess and a retractable vertical hanger, for enabling said animal deterrent and training device (20) to be placed in both horizontal as well as vertical position.

2. The animal deterrent and training device (20) as claimed in claim 1, the housing enclosure of the animal deterrent and training device (20) further comprises of a lower housing chassis (22) and an upper housing cover enclosure (24).

3. The animal deterrent and training device (20) as claimed in claim 1, further comprises of a thumbwheel trajectory adjuster for spray nozzle (59) for adjusting trajectory of the fluid deterrent (21A, 21B) dispersed via the fluid spray nozzle mist spray jet (58).

4. The animal deterrent and training device (20) as claimed in claim 1, wherein a DC motor with gear reduction drive (76) with attached motor shaft eccentric cam actuator (78) is operated by the battery power supply (60A) to draw fluid, water deterrent, or aromatic deterrent from the fluid pump (40) for fluid spray nozzle mist spray jet (58).

5. The animal deterrent and training device (20) as claimed in claim 1, wherein the fluid spray nozzle mist spray jet (58) prevents siphoning or leaking of fluid, water deterrent, or aromatic deterrent.

6. The animal deterrent and training device (20) as claimed in claim 1, wherein the fluid pump (40) further comprises of a fluid reservoir pick-up tube (38), a fluid reservoir pick-up tube filter (39), a fluid pump housing (41), and a fluid pump piston (42).

7. The animal deterrent and training device (20) as claimed in claim 1, further comprises of a mode selector switch (63) which is a 3-way deterrent mode selector switch, enabling a user to select from multiple deterrent methods.

8. The animal deterrent and training device (20) as claimed in claim 1, wherein the animal deterrent and training device (20) is having an active contact mode of deterring and training response with water or fluid deterrent spray jet as an output (10).

9. The animal deterrent and training device (20) as claimed in claim 1, wherein the animal deterrent and training device (20) is having a passive non-contact mode of deterring and training response with aromatic deterrent scent mist-spray as an output (11).

10. The animal deterrent and training device (20) as claimed in claim 1, wherein the deterrent response (17) of the electronic record-play voice module (70) is selected from a group comprising of a sound, a voice, a scolding and a training command.

11. The animal deterrent and training device (20) as claimed in claim 1, further comprises of a low battery indicator LED (61).

* * * * *